United States Patent Office 3,219,091
Patented Nov. 23, 1965

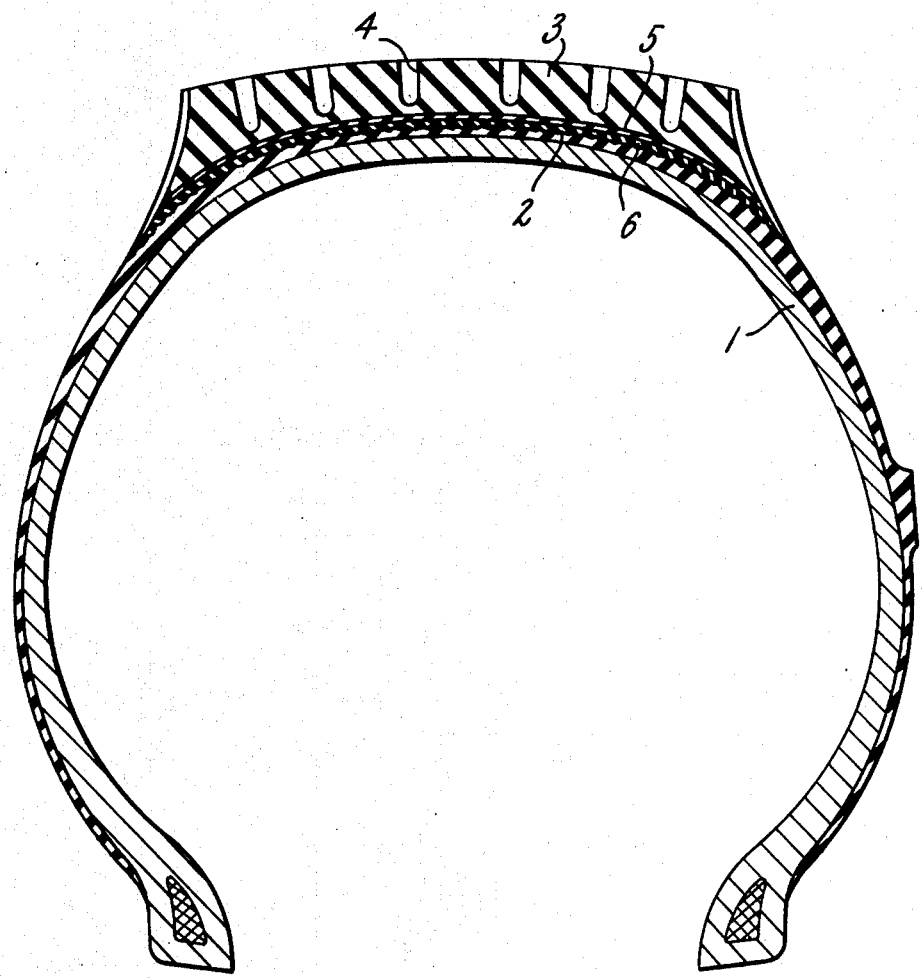

3,219,091
RECAPPING BUTYL TIRE WITH NON-BUTYL TREAD, USING BIS-MALEIMIDE CURED TIE GUM
Alfred N. Iknayan and Albert S. Tavenor, both of Indianapolis, Ind., assignors to United States Rubber Company, New York, N.Y., a corporation of New Jersey
Filed Sept. 11, 1961, Ser. No. 137,379
18 Claims. (Cl. 152—330)

This invention relates to a method of adhering uncured highly unsaturated rubber to cured butyl rubber, and more particularly it relates to recapping butyl rubber tires with non-butyl treads, as well as to improved cured laminates of highly unsaturated rubber to butyl rubber, characterized by improved adhesion.

Relatively recently pneumatic tires made of butyl rubber have appeared on the market in increasing numbers. Butyl rubber, as is well known, is a kind of synthetic rubber made by copolymerizing an isoolefin such as isobutylene with a conjugated diolefin such as isoprene, and it is characterized by the fact that it contains a relatively low degree of unsaturation (it usually contains not more than 10 or 15% of the diolefinic component, frequently less than 3%, and even lower such as 0.5%). When such tires become worn it is frequently desired to recap them by applying conventional recapping materials and vulcanizing and curing such recapping materials to the old tire. Such recapping materials are based on a highly unsaturated rubber compounded for vulcanization. We have found that recapped butyl tires made in this way unfortunately are not always entirely satisfactory. In fact, as a result of examination of a large number of recapped butyl tires and after careful analysis of the causes and types of failures encountered in such tires, we have concluded that the adhesion of new treads based on highly unsaturated rubber to butyl tires is frequently far below the standard that would be desirable.

We have devoted our efforts to finding a way of ameliorating the foregoing difficulty, and we have now discovered, most surprisingly, that if there is interposed, between the cured butyl tire and the uncured new vulcanizable tread material based upon a highly unsaturated rubber, an intermediate layer of highly unsaturated rubber compounded for cure with an N,N'-linked bis-maleimide curative, the adhesion of the new tread upon vulcanization is unexpectedly greatly improved.

By highly unsaturated rubber we mean a rubber or elastomer containing at least 25% of a conjugated diolefinic component, such as isoprene or butadiene. Such rubbers are typified by natural (Hevea) rubber, SBR (styrene-butadiene), polyisoprene and polybutadiene (especially the highly rubbery cis form of the latter two polymers), as well as such copolymers as butadiene-vinylpyridine copolymer or butadiene-styrene-vinylpyridine copolymer. Mixtures of such elastomers with each other, or with other suitable elastomers such as polychloroprene, may be used in the intermediate layer of the invention and in the tread material. For example, the tie gum layer may comprise natural rubber, or a mixture of natural rubber with 0–50% (usually at least 5%) of polychloroprene rubber, based on the weight of the natural rubber plus polychloroprene.

While it is not desired to limit the invention to any particular theory of operation, we believe that the use of a special intermediate layer or tie gum, in accordance with the invention, containing an N,N'-linked bis-maleimide as the curing ingredient, results in improved adhesion because such intermediate layer is not readily subject to over-cure, or reversion, as a result of residual curatives migrating or diffusing out of the cured butyl tire. It will be understood that cured tires, even tires which have been in service for some time, still contain appreciable quantities of substances capable of causing vulcanization. Such substances are residual curatives remaining from the original vulcanizing agents or accelerators introduced in the manufacture of the tire and/or they are decomposition products or derivatives of such vulcanizing agents and accelerators which still have definite curing capacity. These ingredients are "migratory," that is, they are soluble in rubber and are capable of diffusing or moving about within the stock, or even moving from one stock to an adjacent stock, especially at vulcanizing temperatures. If a cured butyl tire is recapped in accordance with conventional practice by vulcanizing uncured recapping materials on the butyl tire, the extra curatives diffusing out of the tire into the recapping material can cause a seriously over-cured condition at the interface with the result that the stock at the interface tends to be weak and have poor physical properties so that a strong, reliable adhesive bond is not obtained. In accordance with the invention, we obviate this difficulty by providing an extra intermediate layer, or special tie gum, of stock which does not tend to become over-cured because it contains a special curative system based on an N,N'-linked bis-maleimide, and is not harmed by any extra curative diffusing into it from the tire. The intermediate interface thus provided by the invention therefore has excellent physical properties and furnishes a strong, permanent bond that persists throughout a long period of service, even under the influence of the intense rapid flexing and high internal temperatures encountered in use.

The invention will be described in more detail with reference to the accompanying drawing, the single figure of which represents, in purely diagrammatic fashion, a cross-sectional view of a recapped butyl rubber tire embodying a special tie gum between the recapping material and the old tire, in accordance with the invention.

Referring to the drawing, the used, cured butyl rubber tire 1 shown therein may be any conventional butyl rubber tire and contains the normal residual migratory curing ingredients (typically sulphur, organic accelerators of sulphur vulcanization, e.g., tellurium diethyl dithiocarbamate or benzothiazyl disulfide) or decomposition products thereof, of zinc oxide, stearic acid, and the like, in conventional amounts. A specific example of a typical butyl rubber tire composition is as follows:

Isoprene-isobutylene rubber (about 2–2.5% isoprene) _____ 100.00
Carbon black _____ 40.00
N-methyl-N,4-dinitrosoaniline _____ 0.33
Zinc oxide _____ 5.00
Petroleum oil softener _____ 12.50
Phenol-formaldehyde resin _____ 2.50
Phenyl-beta-naphthylamine (antioxidant) _____ 1.00
Sulfur _____ 2.00
Tellurium diethyl dithiocarbamate (accelerator) _ 1.25
Benzothiazyl disulfide (accelerator) _____ 1.00

Such a composition is substantially fully vulcanizable under the conditions normally used for curing pneumatic tires. However, in spite of such "full" or "substantially complete" vulcanization in the course of manufacturing the tire, there will be, in ordinary practice, appreciable amounts of remaining curatives, such as vulcanizing agent, accelerator and the like, or decomposition products thereof, which still have latent vulcanizing ability, and which are "migratory," or capable of diffusing from one part of the stock to another, or even into an adjacent rubber stock. Those skilled in the art will understand that considerable variation in a butyl rubber tire formulation of the foregoing type, and in the curing conditions, is permissible in practice.

Preparatory to recapping, the old tread (not shown) is buffed off the used butyl tire 1 in the usual manner leaving a surface 2 of a proper contour on which to apply the recapping materials. The recapping assembly includes a conventional outer tread member 3, which represents the actual wearing surface of the tire and in which the usual pattern of grooves 4 or the like is molded during the recapping, as well as a conventional undertread portion or "cushion gum" 5, which is generally similar to the tread stock but is made up of a somewhat more tacky and less abrasion resistant stock than the tread itself. A relatively thin layer (e.g., 0.010 to 0.060 inch) of the special tie gum 6 of the invention is interposed between the undersurface of the cushion stock 5 of the recapping assembly and the buffed surface 2 of the old butyl tire.

The recapping material, that is, the tread 3 and particularly the cushion gum 5, are based on a highly unsaturated rubber as previously defined compounded for normal vulcanization in the usual way, using sufficient sulfur or equivalent curative and sufficient organic accelerator of sulfur vulcanization to produce a substantially full or complete cure as required to provide good tire tread and cushion gum properties under the curing conditions used for recapping, e.g., heating to a temperature of from 275° to 330° F. for a period of from 40 minutes to 8 hours, it being understood that the time and temperature of cure are in general inversely related and may vary considerably depending on such factors as the size of the tire, the exact formulation used, the character of the heating device, etc.

An example of a suitable stock for the tread portion 3 and an example of a suitable stock for the undertread or cushion 5, are as follows:

| | Parts by weight | |
|---|---|---|
| | Thread stock A | Cushion stock B |
| Smoked sheet natural rubber | | 85.00 |
| SBR rubber (23% styrene) | 100.00 | 15.00 |
| Zinc oxide | 5.00 | 5.00 |
| Carbon black (furnace) | 60.00 | 50.00 |
| Salicylic acid (retarder) | | .25 |
| Antioxidant (e.g. acetone-diphenyl amine condensation product) | 1.00 | .50 |
| Petroleum oil softener | 30.00 | 15.00 |
| Stearic acid | 3.00 | |
| Accelerator (e.g. n-oxydiethylene benzothiazole-2-sulfenimide) | 1.25 | 1.00 |
| Accelerator (diphenyl guanidine) | .50 | .20 |
| Sulfur | 2.00 | 2.50 |

Both the tread stock and the cushion stock are conventional, and it will be understood that they can be based upon any of the highly unsaturated diolefinic polymer rubbers mentioned previously, or mixtures thereof, and it will be appreciated that those skilled in the art will be able to make wide variations in the formulations shown, with equivalent results. It is a characteristic of the tread stock that it contains a sufficient proportion of a reinforcing filler, such as carbon black, silica, lignin, or the like, to permit such stock to achieve a relatively high degree of abrasion-resistance. The cushion stock is generally similar, but may contain a lesser proportion of reinforcing filler. Both of these stocks are compounded, as indicated, in such a manner as to achieve a full state of vulcanization, or a substantially complete vulcanization, under the conditions employed in recapping.

In accordance with the invention the special tie gum layer 6, which is interposed between the outer surface of the cured butyl tire and the under surface of the cushion gum 5 of the recapping material, is prepared from a highly unsaturated rubber, as previously defined, in a manner generally similar to the cushion gum 5 with the important exception that instead of compounding the tie gum for sulfur vulcanization, we compound it for vulcanization with an N,N'-linked bis-maleimide curative. The disclosure of U.S. Patent 2,989,504, Little, June 20, 1961 is incorporated herein by reference as containing a complete description of the N,N'-linked bis-maleimide curatives suitable for use in the invention. N,N'-linked bis-maleimides useful as rubber curatives include those disclosed by Searle in U.S. Patent 2,444,536 issued July 6, 1948, and by Arnold and Searle in U.S. Patent 2,462,835, issued March 1, 1949. Other useful N,N'-linked bis-maleimide curatives are:

N,N'-ethylene bis-maleimide
N,N'-hexamethylene bis-maleimide
2,6-bis-(maleimidomethyl)-4-t-butylphenol
N,N'-[4,4'(2,2'-dichlorodiphenylene)] dimaleimide
N,N'-[4,4'-sulfonyldiphenyl] dimaleimide
N,N'-durylenedimaleimide
N,N'-(N,N'-hexamethylenedicarbamyl) dimaleimide
N,N'-(4,4'-methylenediphenyl) dimaleimide
N,N'-(2,4-tolylene) dimaleimide
N,N'-(1,4-phenylene) dimaleimide
N,N'-(1,2-phenylene) dimaleimide
N,N'-oxydimethylenedimaleimide
1,4-bis-(2-N-maleimidoethyl)durene The useful N,N'-linked bis-maleimides are bis compounds which are joined directly at the nitrogen atoms without any intervening structure, or bis compounds wherein the nitrogen atoms are joined to and separated by an intervening divalent radical, such as alkylene, cycloalkylene, oxydimethyl, phenylene (three isomers), 2,6-dimethylene-4-alkylphenol, or sulfonyl. The bis-maleimides are usually used in amount of from about 0.25 to about 10 parts per 100 parts by weight of the rubbery material in the tie gum.

Usually it is advantageous to use a free radical generator along with the bis-maleimide. Suitable free radical generators include organic peroxides, including hydroperoxides, azo compounds, especially azobisaliphatic nitriles such as 2,2'-azobis-isobutyronitrile, and ionizing radiation. The organic peroxides and hydroperoxides include, for example, 2,4-dichlorobenzoyl peroxides; caprylyl peroxide, lauroyl peroxide, t-butyl peroxyisobutyrate; benzoyl peroxide; p-chlorobenzoylperoxide; di-t-butyl diperphthalate; t-butyl peracetate; t-butyl perbenzoate; dicumyl peroxide; t-butyl hydroperoxide; di-t-butyl peroxide; p-methane hydroperoxide; pinane hydroperoxide; cumene hydroperoxide; 2,5-dimethylhexane-2,5-dihydroperoxide. General purpose thiazole-type accelerators may be used such as 2-mercapto-benzothiazole, 2,2'-dibenzothiazyl disulfide and the benzothiazole sulfenamides, such as N-oxydiethylene-2-benzothiazole sulfenamide, and N-cyclohexyl-2-benzothiazole sulfenamide. The amount of the free radical generating agent usually ranges from about 0.25 to 10 parts per 100 parts by weight of rubbery materials in the tie gum. The kinds and amounts of the curing agents and the time and temperature of cure will of course vary in practice.

The following is an example of a tie gum stock used in the practice of the invention.

Ingredients: Tie gum stock C
Polychloroprene rubber _____ 25.00
Smoked sheet natural rubber _____ 75.00
Zinc oxide _____ 5.00
Carbon black (furnace) _____ 50.00
Petroleum oil softener _____ 8.00
m-Phenylene-bismaleimide _____ 4.00
Dicumyl peroxide _____ .32

In practicing the invention, the uncured vulcanizable tread 3, the uncured vulcanizable cushion stock 5, and the uncured bis-maleimide-compounded tie gum 6 are superimposed as described on the buffed surface 2 of the cured butyl tire. It will be understood that the various layers 3, 5 and 6 are previously formed in approximately the desired shape, for example by extrusion or calendering, and strips of such stocks of appropriate length are superimposed in the desired positions on the cured tire that it is desired to recap. The whole assembly is then disposed in the usual recapping mold (not shown) which is adapted to heat the assembly to proper vulcanizing temperatures, while applying pressure to the assembly and while molding the tread in the desired form. It is surprisingly found that a remarkably strong adhesive bond develops between the cushion stock 5 and the surface 2 of the cured butyl tire, through the agency of the described bis-maleimide-compounded tie gum layer 6. This is in direct contrast to the results obtained if the recapping operation is performed without the special tie gum 6 present, that is, with the cushion gum 5 in direct contact with the surface 2 of the cured butyl tire, in which case the adhesion is unsatisfactory, and early failure of the recapped tire by separation at this interface can be expected.

In order to demonstrate the advantages of the invention in this respect, two series of recapped butyl tires were prepared. In the first series, the cured butyl tires were recapped, using tread stocks and cushion stocks formulated as illustrated above, without any intermediate tie gum of the invention, the curing conditions during the recapping involving heating at a temperature of about 293° F. for about 70 minutes. In the second series, the same procedure was followed, except that a tie gum formulated for bis-maleimide cure in accordance with recipe C, above, was inserted between the cushion gum and the cured tire. The resulting series of recapped tires were tested on a cleated test wheel at 45 miles per hour, with the results shown in Table I, below. Also, adhesion tests were performed to test the strength of the adhesive bond, in pounds, at the interface between the intermediate tie gum and the butyl tire in the case of series 2, and between the cushion gum and the butyl tire in the case of series 1. These adhesion tests are carried out both at 70° F. and at an elevated temperature of 250° F., because the elevated temperature test is a much more severe test, and is believed to be more indicative of the performance to be obtained in actual use of the tire, where considerable heat is generated. The results are summarized in Table I.

Table I

| Test | Series 1 | Series 2 |
| --- | --- | --- |
| Adhesion test, 72° F. (pounds) | 42.0 | 65.0 |
| Adhesion test, 250° F. (pounds) | 6.0 | 12.5 |
| Cleated wheel life, 45 m.p.h. (hours) | 1 4.8 | 2 35.2 |

1 Average of 17 wheel tests. All failures from tread separations at the subject interface.
2 Average of 2 tests. Both tires failed from separation other than at the subject interface.

If desired, the cushion gum 5 can be omitted, and the tread stock 3 and/or the tie gum 2 of the invention may be made correspondingly thicker, in which case the tie gum serves as the bonding medium directly between the tread 3 and the surface 2 of the cured butyl tire 1.

It will be apparent that cured butyl tires recapped in accordance with this form of the invention are indeed remarkable for the strength of the adhesive bond between the recapping materials and the butyl tires.

It will be understood that the references to "recapped" tires and "recapping" as used herein include retreading or any similar repairing or renovation of a cured butyl rubber article by applying vulcanizable highly unsaturated rubber thereto and adhering same with the aid of the special tie gum of the invention compounded for bis-maleimide cure.

Having thus described our invention, what we claim and desire to protect by Letters Patent is:

1. In a method of recapping a used tire made of sulfur-cured isobutylene-isoprene copolymer rubber containing 0.5–15% isoprene wherein an unvulcanized recapping material, comprising a highly unsaturated rubbery polymer containing at least 25% of a diolefin selected from the group consisting of butadiene and isoprene compounded for complete vulcanization with sulfur when heated at a temperature of 275°–330° F. for a period of 40 minutes to 8 hours, is applied to said cured tire and subjected to the just-mentioned vulcanizing conditions, whereby the tire is recapped with said highly unsaturated rubbery polymer, the improvement comprising interposing, between the surface of the cured tire to be recapped and said recapping material, a layer of tie gum comprising a highly unsaturated rubbery polymer as previously defined compounded for vulcanization with from 0.25 to 10 parts of an N,N'-linked bis-maleimide curative, per 100 parts of rubbery polymer in the tie gum, the said tie gum being interposed before carrying out the said vulcanization, whereby the adhesion between the said recapping material is enhanced, the said parts and percentages being by weight.

2. In a method of recapping a used tire made of sulfur-cured isobutylene-isoprene copolymer rubber containing 0.5–15% isoprene wherein an unvulcanized recapping material, comprising a highly unsaturated rubbery polymer containing at least 25% of a diolefin selected from the group consisting of butadiene and isoprene compounded for complete vulcanization with sulfur when heated at a temperature of 275°–330° F. for a period of 40 minutes to 8 hours, is applied to said cured tire and subjected to the just-mentioned vulcanizing conditions, whereby the tire is recapped with said highly unsaturated rubbery polymer, the improvement comprising interposing, between the surface of the cured tire to be recapped and said recapping material, a layer of tie gum comprising a highly unsaturated rubbery polymer as previously defined compounded for vulcanization with from 0.25 to 10 parts of an N,N'-linked bis-maleimide curative, and from 0.25 to 10 parts of an organic peroxide, per 100 parts of rubbery polymer in the tie gum, the said tie gum being interposed before carrying out the said vulcanization, whereby the adhesion between the said recapping material is enhanced, the said parts and percentages being by weight.

3. A method as in claim 2, in which said tie gum comprises natural rubber.

4. A method as in claim 2, in which said tie gum comprises a mixture of natural rubber with up to 50% of polychloroprene rubber.

5. A method as in claim 2, in which said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

6. A method as in claim 2, in which the said N,N'-linked bis-maleimide is m-phenylene bis-maleimide and the said organic peroxide is dicumyl peroxide.

7. A method as in claim 6, in which said tie gum comprises natural rubber.

8. A method as in claim 6, in which said tie gum comprises a mixture of natural rubber with up to 50% of polychloroprene rubber.

9. A method as in claim 6, in which said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

10. A recapped tire comprising a vulcanized assembly of (A) a previously sulfur-cured used tire comprising isobutylene-isoprene copolymer rubber containing 0.5–15% isoprene, (B) a recapping material comprising highly unsaturated rubbery polymer containing at least 25% of a diolefin selected from the group consisting of butadiene and isoprene compounded for complete vulcanization with sulfur when heated to a temperature of 275°–330° F. for a period of 40 minutes to 8 hours, and (C) an intermediate tie gum layer, disposed between said recapping material and said used tire, comprising a highly unsaturated rubbery polymer as previously defined compounded for vulcanization with from 0.25 to 10 parts of an N,N'-linked bis-maleimide curative, per 100 parts of rubbery polymer in the tie gum, the said parts and percentages being by weight.

11. A recapped tire comprising a vulcanized assembly of (A) a previously sulfur-cured used tire comprising isobutylene-isoprene copolymer rubber containing 0.5–15% isoprene, (B) a recapping material comprising highly unsaturated rubbery polymer containing at least 25% of a diolefin selected from the group consisting of butadiene and isoprene compounded for complete vulcanization with sulfur when heated to a temperature of 275°–330° F. for a period of 40 minutes to 8 hours, and (C) an intermediate tie gum layer, disposed between said recapping material and said used tire, comprising a highly unsaturated rubbery polymer as previously defined compounded for vulcanization with from 0.25 to 10 parts of an N,N'-linked bis-maleimide curative, and from 0.25 to 10 parts of an organic peroxide, per 100 parts of rubbery polymer in the tie gum, the said parts and percentages being by weight.

12. A recapped tire as in claim 11, in which said tie gum comprises natural rubber.

13. A recapped tire as in claim 11, in which said tie gum comprises a mixture of natural rubber with up to 50% of polychloroprene rubber.

14. A recapped tire as in claim 11, in which said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

15. A recapped tire as in claim 11, in which the said N,N'-linked bis-maleimide is m-phenylene bis-maleimide and the said organic peroxide is dicumyl peroxide.

16. A recapped tire as in claim 15, in which said tie gum comprises natural rubber.

17. A recapped tire as in claim 15, in which said tie gum comprises a mixture of natural rubber with up to 50% of polychloroprene rubber.

18. A recapped tire as in claim 15, in which said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

References Cited by the Examiner

UNITED STATES PATENTS

| | | | |
|---|---|---|---|
| 2,925,407 | 2/1960 | Goldberg | 260—83.3 |
| 2,981,304 | 4/1961 | Barton et al. | 156—129 |
| 2,989,504 | 6/1961 | Little | 260—62 |

EARL M. BERGERT, *Primary Examiner.*

HAROLD ANSHER, ALEXANDER WYMAN,
*Examiners.*